Patented July 24, 1951

2,562,113

UNITED STATES PATENT OFFICE 2,562,113

OXAZOLINE COMPOUNDS

George W. Moersch, Detroit, Mich., assignor to Parke, Davis & Company, Detroit, Mich., a corporation of Michigan No Drawing. Application April 29, 1950,
Serial No. 159,121

10 Claims. (Cl. 260—307.6)

This invention relates to a new class of oxazoline compounds and to methods for obtaining the same. More particularly, the invention relates to $\Delta^2$-oxazoline compounds having the formula,

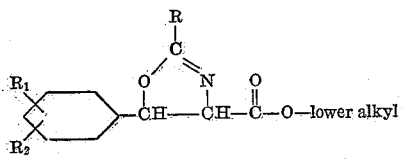

wherein R is a lower alkyl, halogenated lower alkyl, phenyl, phenalkyl, alkylated phenyl, alkoxyphenyl, nitrated phenyl or a halogenated phenyl radical and $R_1$ and $R_2$ are the same or different and represent hydrogen, halogen, lower alkyl or lower alkoxy radicals.

It will be apparent to those skilled in the art that the products of the invention as well as the hydroxyamino esters used as starting materials for their production exist in structural or diastereoisomeric as well as optical isomeric form. The term "structural" isomer or form as used herein refers to the cis or trans, that is, the planar relationship of the phenyl and the

lower alkyl groups to the plane of the oxazoline ring or, in the case of the hydroxyamino esters, of the two most highly polar groups to the plane of the two asymmetric carbon atoms. To differentiate between the two diastereoisomers the cis compounds will subsequently be referred to as the "regular" (reg.) series or form and the trans diastereoisomers as the "pseudo" ($\psi$) series or form. Such cis compounds are those products wherein both the phenyl and the

lower alkyl groups are on the same side of the plane of the oxazoline ring and in the case of the hydroxyamino esters the two most highly polar groups lie on the same side of the plane of the two asymmetric carbon atoms. Conversely, the trans or pseudo compounds are those wherein the aforementioned groups are on the opposite sides of the plane of the asymmetric carbon atoms or oxazoline ring. Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers, the notation "unresolved" will be used. However, it should be expressly understood that where no notation appears with a structural formula the formula should be interpreted in its generic sense, that is, as representing the (1)-$\psi$, (d)-$\psi$, (1)-reg. or (d)-reg. isomers in separated form as well as the (dl)-$\psi$ or (dl)-reg. optical racemates or the total unresolved mixture of the structural and optical isomers. Such a formula does not merely represent the unresolved mixture of isomers.

In accordance with the invention, $\Delta^2$-oxazoline compounds having the above formula are produced by reacting a hydroxyamino ester compound of formula,

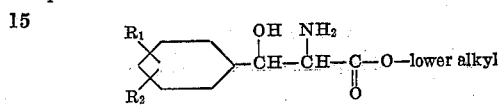

with an imino ether compound of formula,

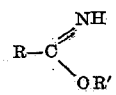

or a salt thereof; where R, $R_1$ and $R_2$ have the same significance as given above and R' is an alkyl, phenyl or phenalkyl radical. The reaction is carried out at a temperature below about 50° C. and preferably at about 20-35° C. A wide variety of solvents such as water, lower aliphatic alcohols, both aqueous and anhydrous, chloroform, ether and the like can be employed. Since, in many instances the free bases of the imino ethers are rather unstable, it is preferable to use the imino ether compound in the form of a mineral acid salt. The hydroxyamino ester compound can be employed in either the free base or salt form although when a salt is used one equivalent of a basic substance such as aqueous ammonia, sodium bicarbonate, sodium hydroxide and the like should be added to the reaction mixture to liberate the free hydroxyamino ester compound in situ. In the case of the more unstable imino ether compounds it is also preferable to use an anhydrous solvent for the reaction. The transformation which takes place can be diagrammatically represented as follows:

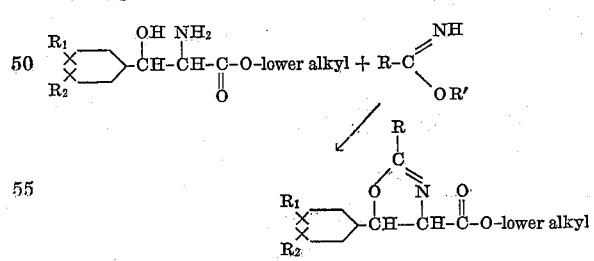

where R, $R_1$, $R_2$ and R' have the same significance as given above.

The products of the invention are of particular value as intermediates for the preparation of the very valuable antibiotic, chloramphenicol, and other therapeutically valuable organic compounds structurally related thereto.

The invention is illustrated by the following examples.

*Example 1*

12.3 g. of ethyl (dl)-φ phenyl serinate hydrochloride and 9.3 g. of benzimino ethyl ether hydrochloride are shaken in 50 cc. of absolute ethanol containing 3.37 cc. of concentrated ammonium hydroxide. A white precipitate starts to separate almost immediately. After fifteen minutes the reaction mixture is diluted with 4 volumes of water and the precipitated oil extracted with two portions of ether. The extract is dried over magnesium sulfate, decanted and evaporated. The residual oil crystallizes on standing and is purified by recrystallization from methanol; M. P. 83.4° C. The product thus obtained is (dl)-ψ-2,5-diphenyl-4-carbethoxy-$\Delta^2$-oxazoline of the formula,

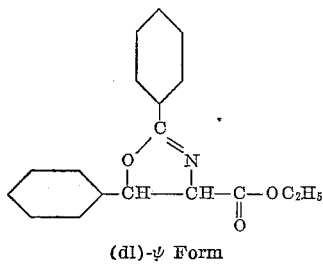

(dl)-ψ Form

*Example 2*

20.9 g. of ethyl (dl)-ψ phenyl serinate and 11.3 g. of acetimino ethyl ether hydrochloride are shaken together in 50 cc. of dry chloroform for one-half hour at 25° C. The reaction mixture is filtered to remove the insoluble ammonium chloride and the chloroform distilled from the filtrate in vacuo. The residual oil thus obtained is (dl) - ψ - 2 - methyl - 4 - carbethoxy - 5 - phenyl-$\Delta^2$-oxazoline which has the formula,

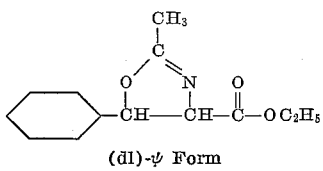

(dl)-ψ Form

*Example 3*

20.9 g. of ethyl (l)-ψ phenyl serinate and 11.3 g. of acetimino ethyl ether hydrochloride are shaken together in 50 cc. of dry chloroform for one-half hour at room temperature. The reaction mixture is filtered to remove the insoluble ammonium chloride and the chloroform distilled from the filtrate in vacuo. The residual oil thus obtained is (l) - ψ - 2 - methyl - 4 - carbethoxy - 5-phenyl-$\Delta^2$-oxazoline which has the formula,

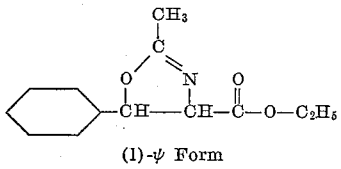

(l)-ψ Form

*Example 4*

20.9 g. of ethyl (l)-ψ phenyl serinate and 18.2 g. of dichloroacetimino ethyl ether hydrochloride are shaken together in 50 cc. of dry chloroform for one-half hour at 25° C. The reaction mixture is filtered to remove the insoluble ammonium chloride and the chloroform distilled from the filtrate in vacuo. The residual oil thus obtained is (l) - ψ - 2 - dichloro-methyl - 4 - carbethoxy - 5 - phenyl - $\Delta^2$ - oxazoline which has the formula,

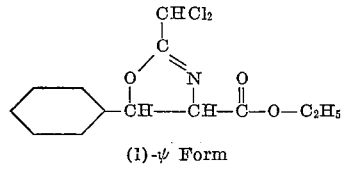

(l)-ψ Form

*Example 5*

19.5 g. of methyl (dl)-ψ phenyl serinate and 14.5 g. of chloroacetimino methyl ether hydrochloride are shaken together in 75 cc. of dry dioxane for one-half hour at room temperature. The reaction mixture is filtered to remove the insoluble ammonium chloride and the dioxane distilled from the filtrate in vacuo. The residual oil thus obtained is (dl) - ψ - 2 - chloromethyl - 4 - carbomethoxy - 5 - phenyl - $\Delta^2$ - oxazoline of formula,

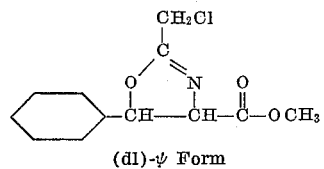

(dl)-ψ Form

*Example 6*

22.5 g. of methyl (dl)-ψ m-methoxyphenyl serinate and 22.1 g. of m-chlorobenzimino ethyl ether hydrochloride are shaken in 200 cc. of absolute alcohol. After about fifteen minutes to one-half hour the reaction mixture is diluted with several volumes of water and the insoluble product collected. The product is taken up in ether, the ether solution dried and then the ether removed by distillation. The residual oil crystallizes on standing and is purified by recrystallization from methanol. The product thus obtained is (dl) - φ - 2 - m - chlorophenyl - 4 - carbomethoxy - 5 - m - methoxyphenyl - $\Delta^2$ - oxazoline of formula,

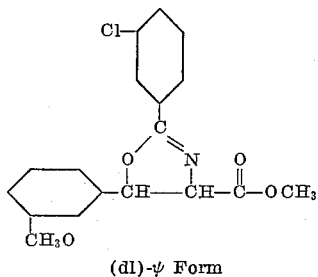

(dl)-ψ Form

*Example 7*

12.5 g. of n-propyl (dl)-ψ-3,4-dimethylphenyl serinate and 12.5 g. of p-methylbenzimino ethyl ether hydrobromide are shaken together in 100 cc. of absolute ethanol. After one-half hour at room temperature the reaction mixture is diluted with 5 volumes of water and the insoluble product collected. The crude product is taken up in ether, the ether extract dried and the ether distilled. The residual oil crystallizes on standing and is purified by recrystallization from alcohol. The product thus obtained is (dl)-ψ-2-p- methylphenyl - 4 - carbopropoxy - 5 - (3', 4' - dimethylphenyl)-Δ²-oxazoline of formula,

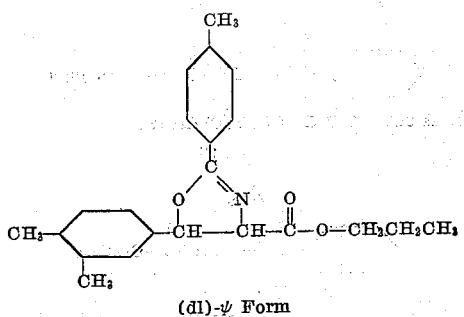

(dl)-ψ Form

Example 8

A mixture consisting of 15.5 g. of methyl (dl)-reg.-p-bromophenyl serinate hydrochloride and 10.1 g. of o-methoxy-benzimino methyl ether hydrochloride in 150 cc. of aqueous methanol containing 3.37 cc. of concentrated ammonium hydroxide solution is shaken at room temperature for about one-half hour. The reaction mixture is diluted with 5 volumes of water and the crude (dl)-reg.-2-o-methoxyphenyl-4-carbomethoxy-5-p-bromophenyl-Δ²-oxazoline collected. The crude product is dissolved in ether, the ether extract dried and the ether distilled. The residue which crystallizes on standing is purified by recrystallization from methanol. The formula of this product is,

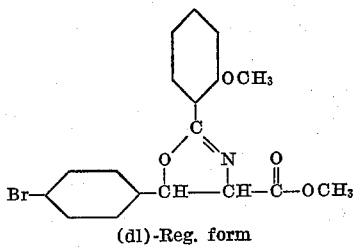

(dl)-Reg. form

Example 9

A mixture consisting of 11.2 g. of ethyl (dl)-ψ-p-methylphenyl serinate and 10.9 g. of m-nitrobenzimino methyl ether hydrochloride in 100 cc. of absolute ethanol is shaken at room temperature for about one-half hour. The reaction mixture is diluted with 5 volumes of water and the precipitated (dl)-ψ-2-m-nitrophenyl-4-carbethoxy-5-p-methylphenyl-Δ²-oxazoline collected. This product which has the formula,

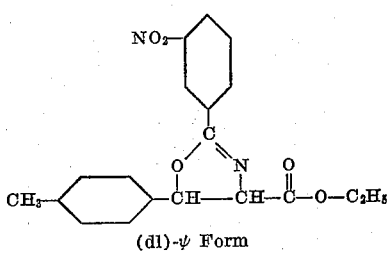

(dl)-ψ Form can be purified, if desired, by recrystallization from the methanol.

Example 10

A mixture consisting of 17.9 g. of methyl (dl)-reg.-p-iodophenyl serinate hydrochloride and 10. g. of phenylacetimino ethyl ether hydrochloride in 100 cc. of absolute ethanol containing 3.37 cc. of concentrated ammonium hydroxide is shaken at 25° C. for one-half hour. The reaction mixture is diluted with 5 volumes of water and the crude product separated. The crude product is taken up in ether, the ether solution dried and the ether distilled. The residual oil which consists of (dl)-reg.-2-benzyl-4-carbomethoxy-5-p-iodophenyl-Δ²-oxazoline crystallizes on standing and is purified by recrystallization from alcohol. The formula of this product is,

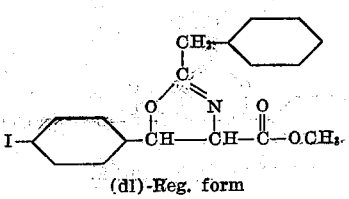

(dl)-Reg. form

What I claim is:

1. A compound of the formula,

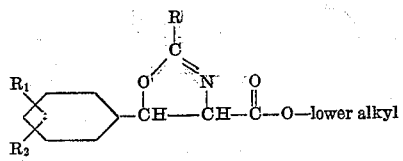

where R is a member of the class consisting of lower alkyl, halogenated lower alkyl, phenyl, phenalkyl, alkylated phenyl, alkoxyphenyl, nitrated phenyl and halogenated phenyl radicals and $R_1$ and $R_2$ are members of the class consisting of hydrogen, halogen, lower alkyl and lower alkoxy radicals.

2. A compound of the formula,

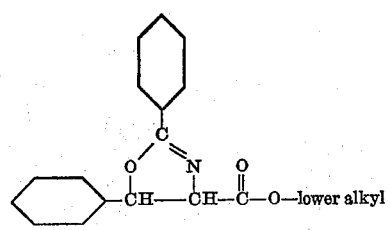

3. A compound of the formula,

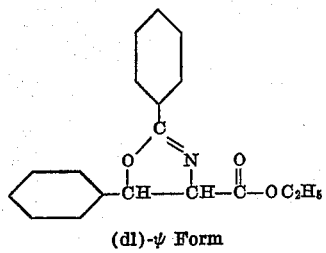

(dl)-ψ Form

4. A compound of the formula,

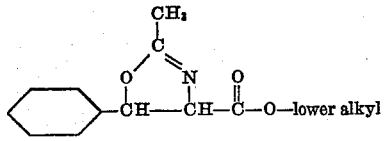

5. A compound of the formula,

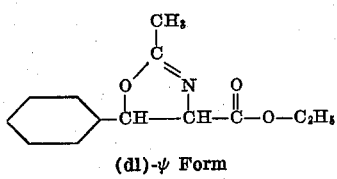

(dl)-ψ Form

6. A compound of the formula,
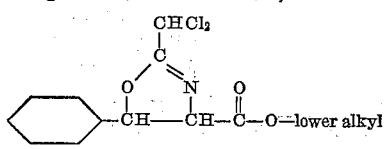
(l)-ψ Form
7. A compound of the formula,
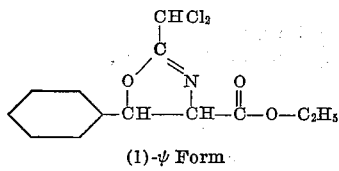
8. A compound of the formula,
CHCl₂
|
C
/ \\
O    N    O
|    |    ‖
-CH——CH—C—O—C₂H₅
(l)-ψ Form
9. A compound of the formula,
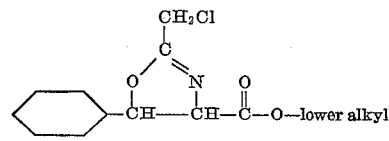
10. A compound of the formula,
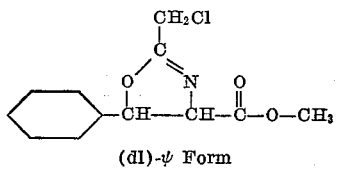
(dl)-ψ Form
GEORGE W. MOERSCH.
REFERENCES CITED
The following references are of record in the file of this patent:
UNITED STATES PATENTS
| Number | Name | Date |
| --- | --- | --- |
| 2,372,409 | Tryon | Mar. 27, 1945 |